United States Patent [19]

Rhoden

[11] 4,177,734
[45] Dec. 11, 1979

[54] DRIVE UNIT FOR INTERNAL PIPE LINE EQUIPMENT

[75] Inventor: Gary S. Rhoden, Houston, Tex.

[73] Assignee: Midcon Pipeline Equipment Co., Houston, Tex.

[21] Appl. No.: 838,860

[22] Filed: Oct. 3, 1977

[51] Int. Cl.² .............................................. B61B 13/10
[52] U.S. Cl. ............................. 104/138 G; 15/104.05; 73/40.5 R; 118/105; 118/254; 118/306; 118/317; 118/DIG. 10; 134/166 C; 250/358 P; 254/134.5
[58] Field of Search ....................... 104/138 R, 138 G; 105/365; 15/104.03, 104.05, 104.3 R; 134/166 C, 167 C, 168 C, 169 C; 254/134.5; 33/1 H, 178 F; 73/40, 40.5 R, 40.5 A; 72/466; 250/358 P; 118/105, 254, 306, 317, 408, DIG. 10

[56] References Cited

U.S. PATENT DOCUMENTS

| | | | |
|---|---|---|---|
| 1,860,385 | 5/1932 | Crapo | 254/134.5 |
| 2,758,352 | 8/1956 | Perkins | 118/306 X |
| 3,078,823 | 2/1963 | Cummings et al. | 118/317 X |
| 3,135,629 | 6/1964 | McLean | 118/408 |
| 3,691,385 | 9/1972 | Ketchbaw et al. | 250/358 P |
| 3,979,941 | 9/1976 | Auxer | 104/138 G X |
| 4,021,925 | 5/1977 | Loftus | 33/178 F X |

FOREIGN PATENT DOCUMENTS 1197088  11/1959  France ..................................... 118/306

*Primary Examiner*—Randolph A. Reese
*Attorney, Agent, or Firm*—Carl B. Fox, Jr.

[57] ABSTRACT

Drive unit for internal pipeline equipment, wherein the drive motor which drives the drive unit is disposed parallel to the pipe axis instead of transverse to the pipe axis, thereby to occupy a reduced space transverse to the length of the pipe and enabling a drive motor of given size to be used in a drive unit of smaller diameter than would be possible if the drive motor were disposed transverse to the pipe axis. In this way, drive units may be adapted for use in pipes of relatively smaller diameters than has heretofore been possible.

15 Claims, 6 Drawing Figures

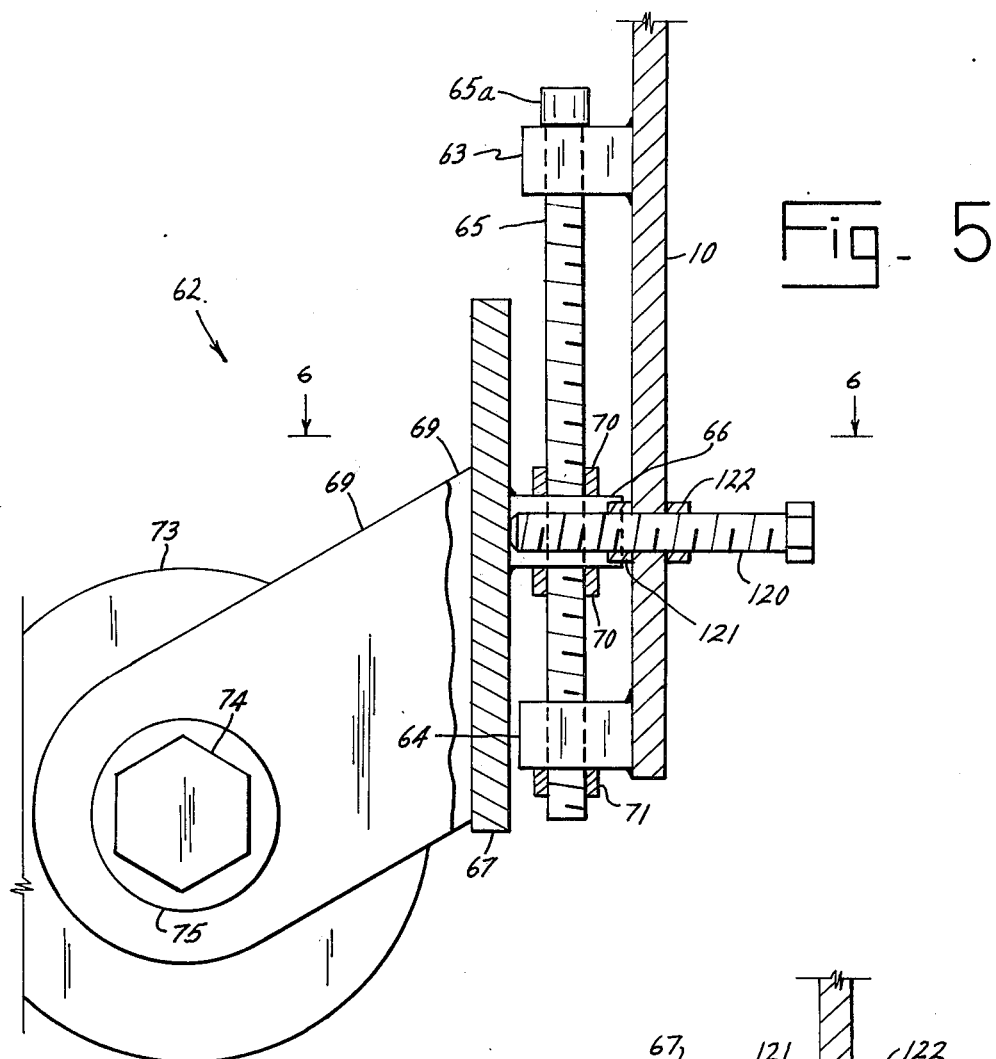
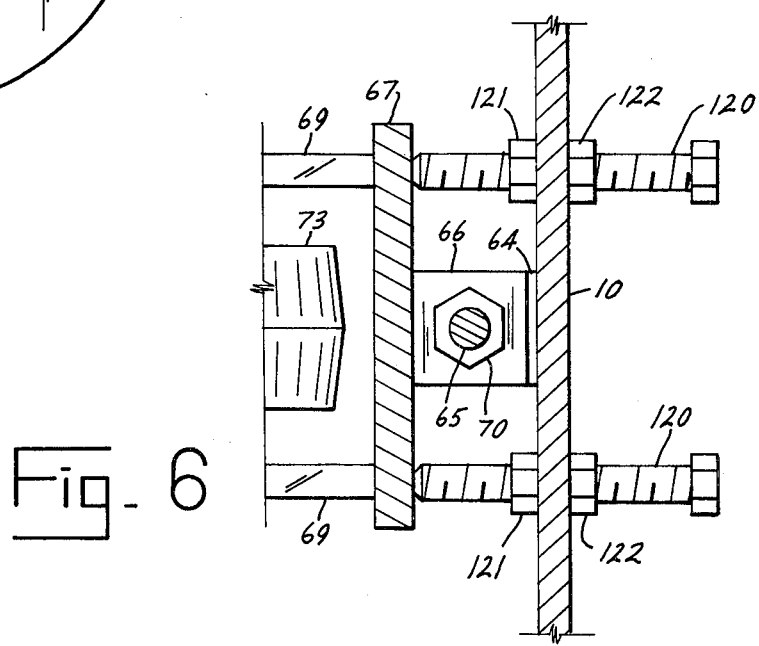

DRIVE UNIT FOR INTERNAL PIPE LINE EQUIPMENT

BACKGROUND OF THE INVENTION

In drive units for internal pipeline equipment, that is, equipment which is used within the interior of a pipe or pipeline and which must be capable of traveling through the length of the pipe or pipeline, the drive motors, usually pneumatic or hydraulic, have conventionally been disposed with their axes transverse to the pipe axis and in line with or parallel to the drive wheels of the drive unit. This relationship between the driving wheels and the drive motors which drive them limits the utility of such apparatuses to pipes of relatively large diameter, because the lengths of the pneumatic or hydraulic motors which must be used are such that drive units could not be designed for use in relatively small diameter pipes. For example, in U.S. Pat. No. 3,747,394 and U.S. Pat. No. 3,979,941 the drive motors of the drive units shown are disposed aligned with the drive wheels and transverse to the pipe axis, and such devices could not be designed for use in relatively small diameter pipes.

SUMMARY OF THE INVENTION

The invention provides drive units for internal pipeline equipment in which the motors which drive the drive wheels of the drive units are disposed longitudinally of the drive units and of a pipe in which a drive unit is disposed in order that the apparatus may be designed for use in pipes of relatively small diameter. This is accomplished through the use of right angle or 90° gear units associated with the driving wheels whereby the driving wheels may be driven by drive shaft assemblies which are parallel to the axis of the drive unit and pipe. The right angle or 90° gear units occupy much smaller spaces than do the motors which drive the driving wheels. In the preferred embodiment of apparatus hereinafter described, a single drive motor drives two driving wheels of the drive unit, but the apparatus may include a single driving wheel driven by the motor unit, and apparatuses may alternatively be provided wherein a separate drive motor is associated with each of plural driving wheels.

A principal object of the invention is to provide a drive unit for internal pipeline equipment which is of reduced diameter and which may be designed for use in pipes of relatively small diameters. Another object of the invention is to provide such drive units wherein the driving wheels are driven by one or more drive motors disposed parallel to the axis of the drive unit and of the pipe in which the drive unit is used. A further object of the invention is to provide such drive units which are efficient, safe, dependable, and economical. Yet another object of the invention is to provide such drive units which may be utilized in pipes of different diameters.

Other objects and advantages of the invention will appear from the following detailed description of a preferred embodiment thereof, reference being made to the accompanying drawings.

BRIEF DESCRIPTIONS OF THE DRAWINGS

FIG. 5 is an enlarged partial angular elevation, shown partially in cross section, showing a wheel assembly of the apparatus shown in FIG. 1.

FIG. 6 is an angular cross section taken at line 6—6 of FIG. 5.

DESCRIPTION OF THE PREFERRED EMBODIMENTS

Figure 1:
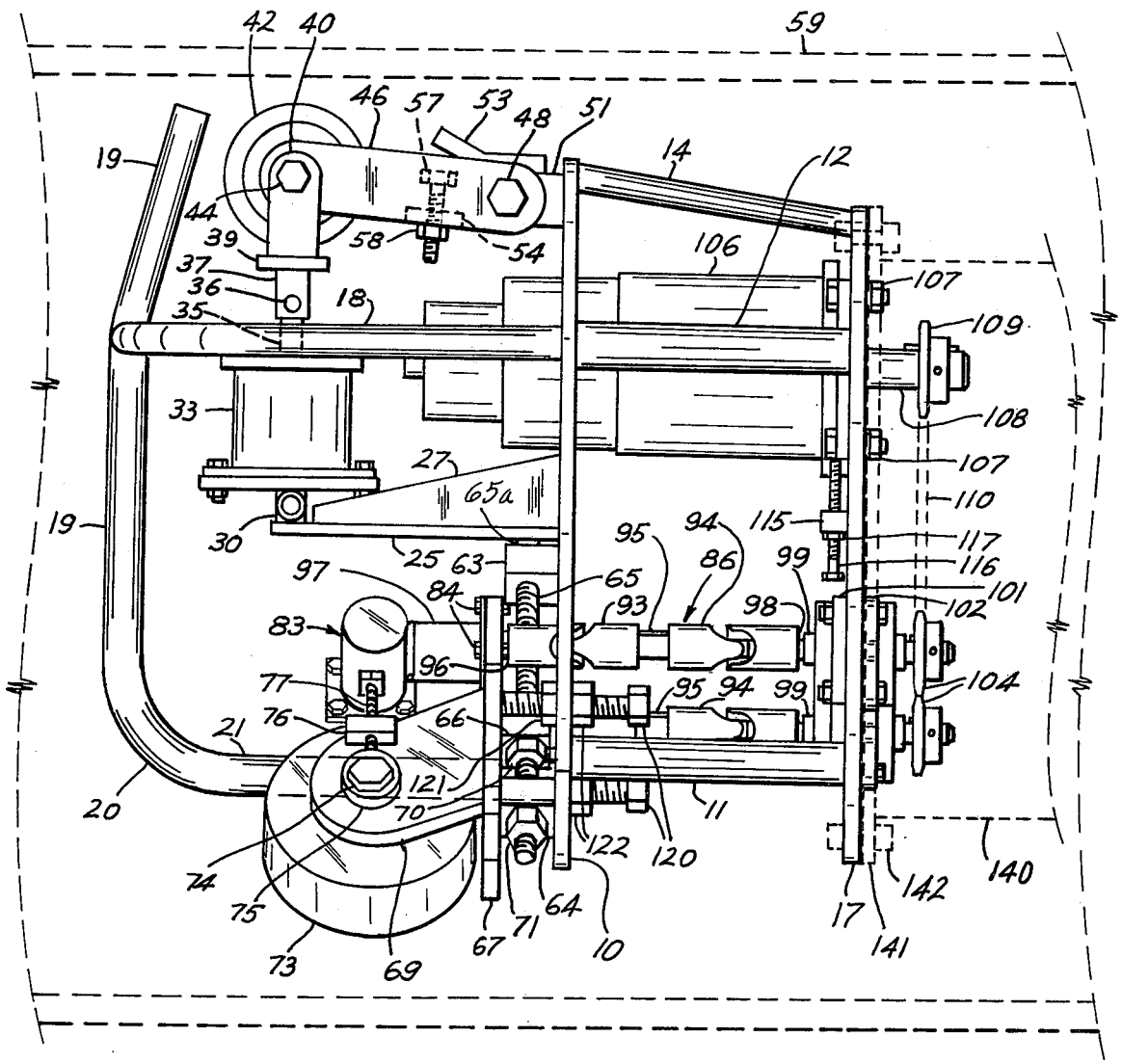
FIG. 1 is a side elevation of a preferred embodiment of apparatus according to the invention.
Figure 2:
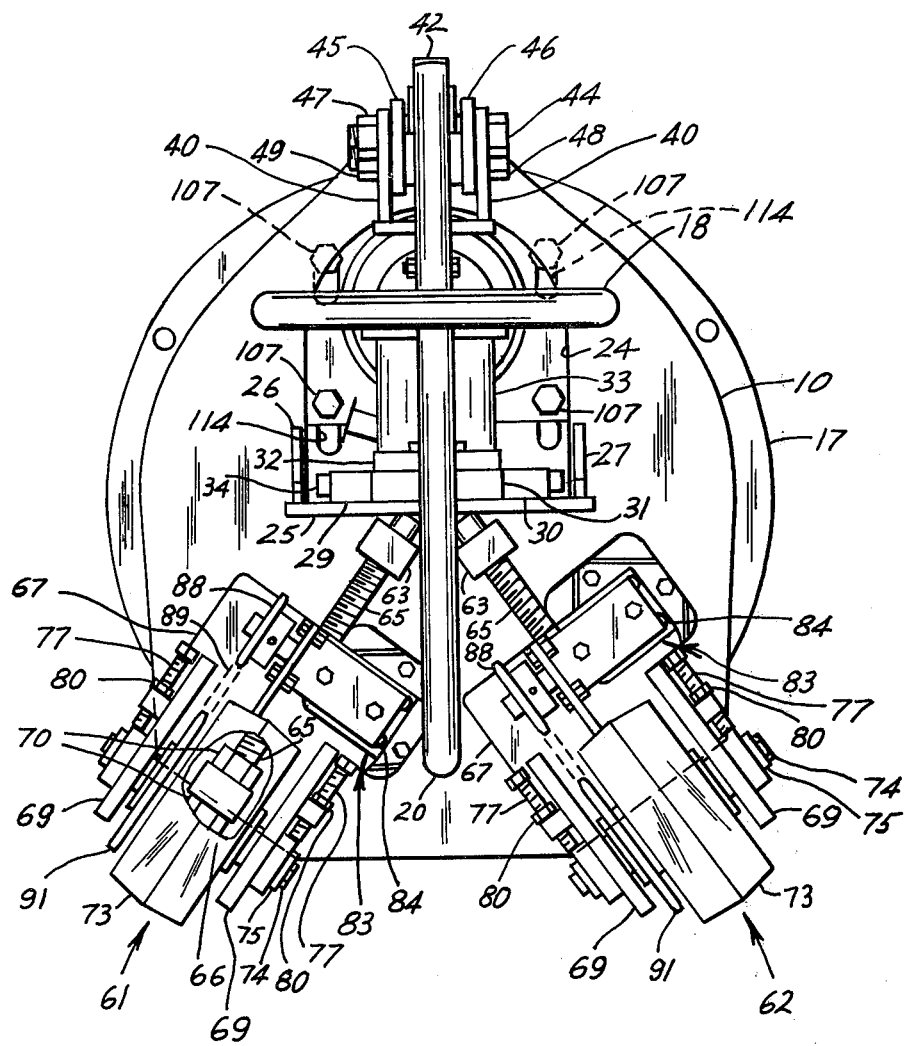
FIG. 2 is an end elevation of the apparatus shown in FIG. 1, taken from the left hand end of the apparatus as shown in FIG. 1.
Figure 3:
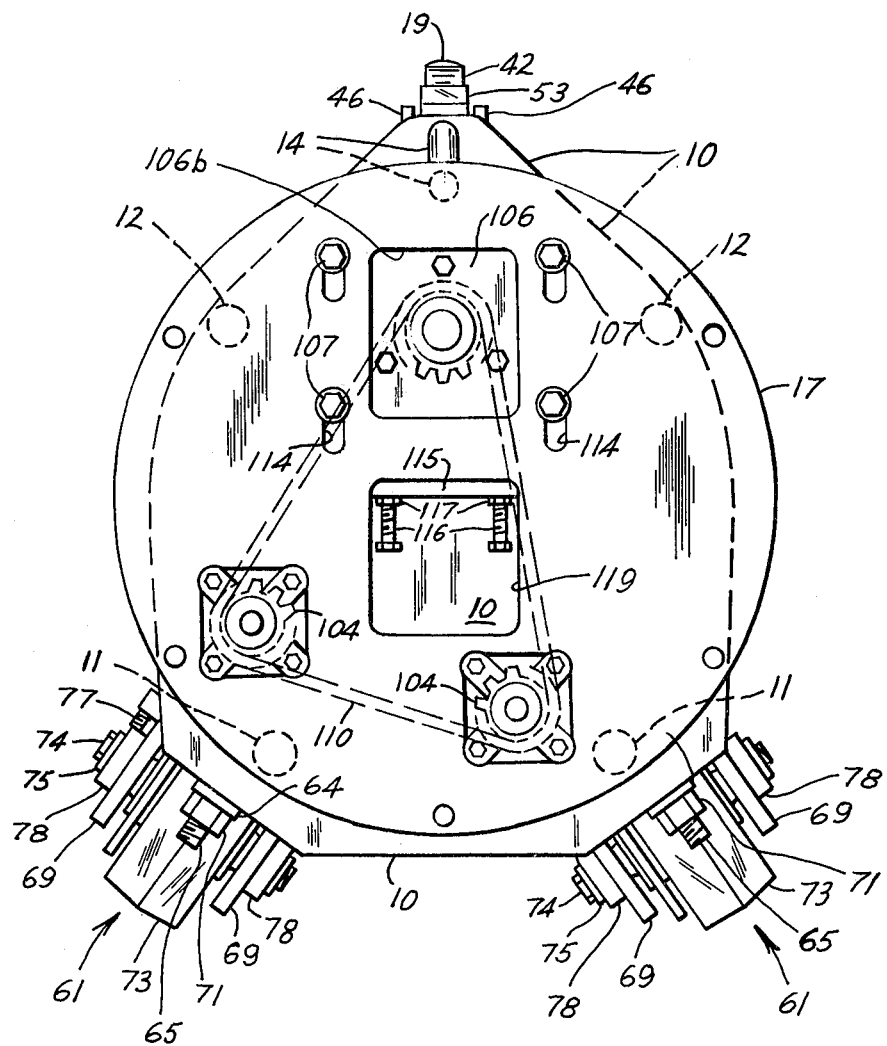
FIG. 3 is an end elevation of the apparatus shown in FIG. 1, taken from the right hand end of the apparatus as shown in FIG. 1.

Referring now to the drawings in detail, the preferred embodiment of apparatus shown therein will be described. A plate 10, the shape of which is best seen in FIGS. 2 and 3, has welded thereto a pair of lower support rods 11, one at each side of the apparatus, and a pair of upper support rods 12, one at each side of the apparatus, and an upper angular support rod 14. Plate 17 is welded to the right hand ends of rods 11, 12, and 14, as is best shown in FIG. 1. At its left hand side, plate 10 has welded thereto a pair of horizontal curved oppositely disposed guard rods or tubes 18, and a nose rod 19 which is upright at its left hand portion and which curves at 20 to extend horizontally at its portion 21 to connection with plate 10. The guard tubes 18 and 19 serve to protect the elements disposed therewithin from damage caused by impact with the end of a pipe into which the apparatus is introduced and from damage caused by impact with other apparatus which the drive unit may be run into within a pipeline.

Plate 10 has a cutout opening 24 which is rectangular at its lower portion and semicircular at its upper portion. At the lower side of opening 24 a horizontal plate 25 is welded to plate 10 and reinforced by gusset plates 26, 27. At its left hand end (FIG. 1) plate 25 carries a pivotal support consisting of perforate end members 29, 30 secured to plate 25 and central perforate member 31 secured to base 32 of cylinder 33, and a pin 34 disposed therethrough. This connection provides that cylinder 33 may pivotally move longitudinally of the apparatus to a limited extent. Shaft 35 of cylinder 33 is rigidly pinned by a pin 36 into a sleeve 37 affixed to plate 39. Plate 39 carries a pair of upstanding parallel yoke plates 40, one at each end of plate 39, which form a yoke for support of wheel 42. Wheel 42 is disposed between yoke plates 40, and axial screw 44 is disposed through suitable openings through plates 40, toggle elements 45, 46, and the wheel unit. A nut 47 secures the assembly together.

The opposite ends of toggles 45, 46 are connected by screw 48 secured by nut 49 to a pair of parallely spaced brackets 51 which depend from the upper side of plate 10. An angular plate 53 is affixed by welding to the upper sides of brackets 51. A transverse plate 54 is secured by welding between toggle elements 45, 46. Plate 54 has a tapped opening therethrough into which is threaded a screw 57 secured in position by lock nut 58. The extent of screw 57 above plate 54 may be adjusted. Screw 57 functions in conjunction with plate 53 to limit the outward (upward) movement of wheel 42 in order that wheel 42 will not move to an outward (upward) position such that the introduction of the apparatus into the end of a pipe would be hindred. From a practical standpoint, screw 57 must adjust in a position such that wheel 42 may not move outwardly so that more than half its diameter is outside the inner diameter of the pipe 59. Preferably, screw 57 should be adjusted to keep wheel 42 somewhat farther inward.

A pair of wheel units 61, 62 are each supported by a pair of blocks 63, 64 affixed by welding, to the left hand side of plate 10 as shown in FIG. 1. Wheel units 61, 62 are shown also in FIGS. 2, 3, 5 and 6. Blocks 63, 64 are positioned angularly and each has an unthreaded opening therethrough to receive a threaded shaft 65. Enlarged end 65a of shaft 65 inward of block 63 prevents outward movement of shaft 65 but permits rotation of the shaft. Threaded shaft 65 is screwed through a tapped opening of a block 66 affixed by welding to a plate 67. Plate 67 is of irregular shape, and has affixed thereto a pair of parallely disposed brackets 69. The radial position of plate 67 may be adjusted by rotation of threaded shaft 65 to move block 66 and plate 67 radially inward or outward. Locknuts 70, 71 when tightened fix shaft 65 and block 66 secured in position. A wheel 73 is supported between brackets 69 by axle bolt 74. The head of bolt 74 and the nut at the opposite end of bolt 74 each have a washer 75 disposed therebeneath. Two wheels 73 are mounted at opposite sides of the apparatus, at opposite outward radial angles, as best shown in FIG. 2.

Blocks 76 affixed to each bracket 69 each have a tapped opening through which a screw 77 is threaded. Each screw 77 is tightened against one of the discs 78 carried around the opposite ends of the axle bolts to stabilize the positions of the axle bolts. Lock nuts 80 (FIG. 2) are provided to fix the positions of bolts 77.

A right angle drive assembly 83, one for each wheel, is affixed to each plate 67 by bolts 84. Each right angle drive assembly 83 is driven by a drive shaft assembly 86 (FIG. 1), and delivers rotational power at right angles to the direction of rotation input through a chain sprocket. The chain 89 disposed around each sprocket 88 is also engaged around a larger sprocket 91 carried by each wheel axle 74.

Each drive shaft assembly 86 includes a pair of universal elements 93, 94 connected by intermediate shaft 95. End 96 of each driveshaft assembly is connected to portion 97 of one of the right angle drive assemblies. The opposite end 98 of each drive shaft assembly 86 is connected to a shaft 99 which is journaled through plate 17. A bearing assembly including elements 101, 102 is mounted on plate 17. At the right hand end (FIG. 1) of each shaft 99, there is carried a sprocket 104.

A hydraulic (or pneumatic) drive motor 106 is secured to plate 17 by bolts 107. Openings 24, 106b, are provided through plates 10, 17, respectively, to accommodate drive motor 106. Shaft 108 of the drive motor carries a chain sprocket 109 at its right hand end (FIG. 1). A drive chain 110 is disposed around sprocket 109 and both sprockets 104. Operation of drive motor 106 causes rotation of each sprocket 104 to rotate the respective wheels 73 through the respective right angle drives and drive shaft assemblies hereinbefore described, all of these elements rotating in the same direction.

It is clear that chain 110 may engage only one sprocket 104 to drive only one wheel 73, or chain 110 may engage two sprockets 104, as shown. The drive train for one wheel 73 would, of course, be omitted if only one wheel 73 is to be driven.

The radial position of drive motor 106 may be adjusted by adjusting the positions of bolts 107 in slots 114 through plate 17. This adjustment enables chain 110 to be properly tensioned. Tapped plate or bar 115 affixed to plate 17 has screws 116 screwed therethrough and fixed by lock nuts 117 to bear against the underside of drive motor 106 to prevent accidental loosening of chain 110 by slippage of bolts 107 in slots 114. An opening 119 is provided through plate 17 for access to screws 116.

Referring again to FIG. 1 of the drawings, a pair of screws 120 are screwed through tapped openings in plate 10 at opposite sides of each screw 65 to engage each plate 67. Screws 120 are locked in place by lock nuts 121, 122 at opposite sides of plate 10. The longitudinal positions of screws 120, which bear at their left hand ends (FIG. 1) against plate 67, may be adjusted to adjust the camber of each of the wheels 73 by rotation of the plate 67 and the wheel which it supports about the axis of the screw 65. The camber adjustment is often necessary to assure that the apparatus will roll through a pipe without tending to rotate within the pipe, this adjustment thereby providing that the apparatus may easily be made to maintain an upright position within a pipe.

The particular objects and advantages of the invention may not yet be quite clear. As stated earlier, the drive motor 106 is disposed in a direction longitudinal of the apparatus and pipe in order that the apparatus may be accommodated to pipes of relatively small diameter. In conventional drive assemblies for internal pipeline equipment, the drive motors which drive the wheels corresponding to wheels 73 are disposed parallel to the axes of the wheels, i.e. such motors are conventionally disposed parallel to a diameter of a pipe within which the apparatus is disposed. Because of the length of the drive motors which must be used, there is insufficient room in the case of smaller diameter pipes for positioning of the drive motors in the conventional manner.

Figure 4:
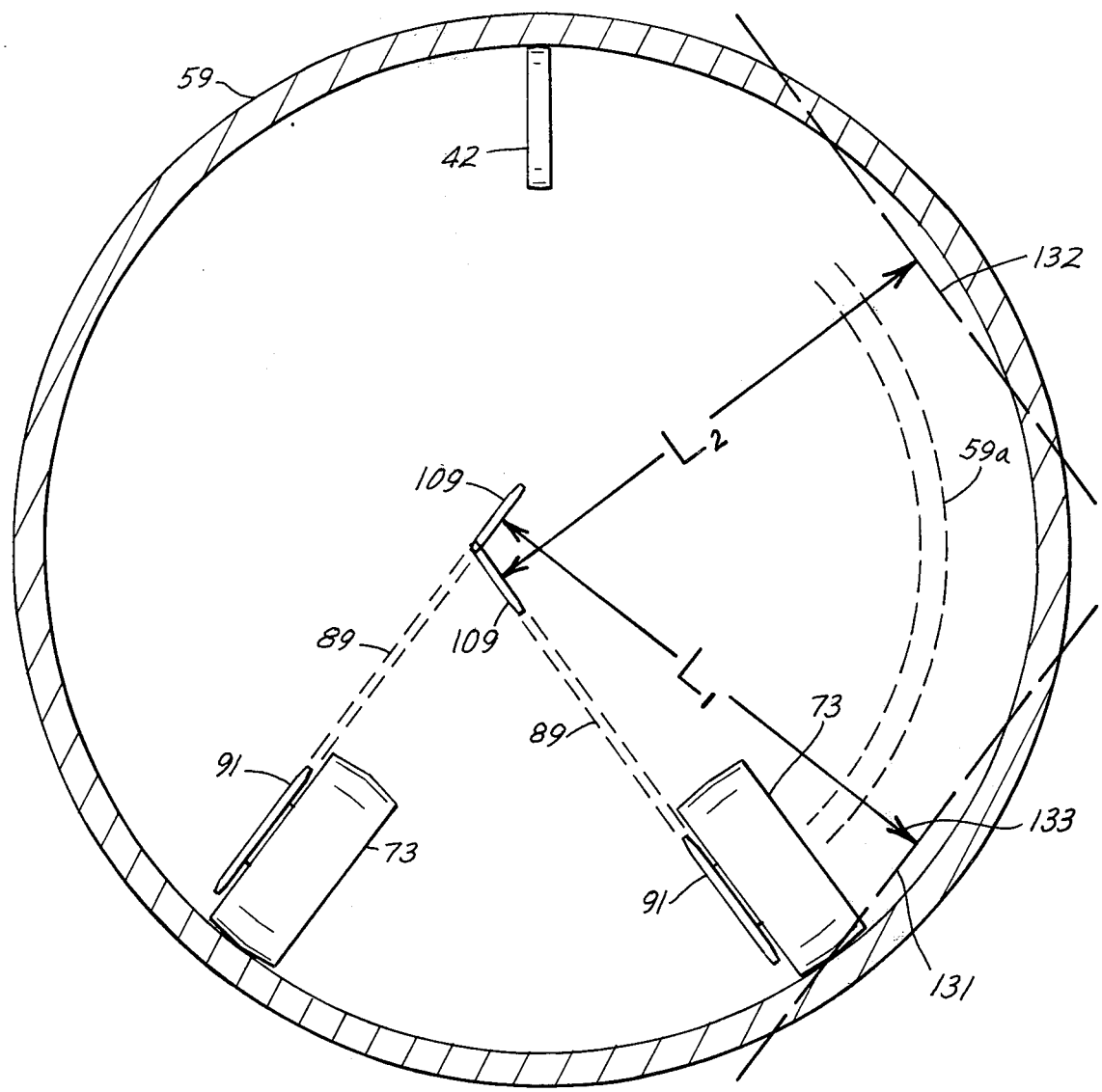
FIG. 4 is a schematic drawing illustrating the advantages of disposing the drive motors parallel to the pipe axis.

Referring to FIG. 4 of the drawings, this drawing figure is a schematic drawing showing the two wheels 73 each having a chain sprocket 91 associated therewith. Dimensions L-1 indicates, along a diameter of pipe 59, the length of a drive motor 106 disposed with its sprocket 109 aligned with the sprocket 91 of the left hand wheel 73. Dimension L-2 indicates the length, also along a diameter of pipe 59, of another drive motor 106 disposed with its chain sprocket 109 aligned with the chain sprocket 91 of the right hand wheel 73. Diametric positions of the drive motors along dimensions L-1, L-2 provide the greatest possible spaces within pipe 59 for the drive motor lengths. The drive motor at dimensions L-1 terminates outwardly at dashed line 131, while the drive motor at dimension L-2 terminates at outwardly at dashed line 132. If the drive motors were moved away from the pipe diameters at which they are disposed in either direction to a side of either line L-1 or L-2, then the space available within pipe 59 for the lengths of the drive motors would be less than the space shown where the drive motors are located along pipe diameters. The outer arrow heads 133 of lines L-1 and L-2 are too close to the pipe wall to provide entrance clearance for the apparatus, so that it is clear that a drive motor 106 may not be positioned as indicated along either line L-1 or line L-2 even along the pipe diameter. If the lines L-1, L-2 are moved either toward or away from the respective wheels 73, maintaining the newly positioned lines L-1, L-2 parallel to their positions shown in the drawings, there is even less space for the lengths of the drive motors 106. If pipe 59 is of any smaller diameter, for example, the diameter indicated at dashed line showing 59a, it is clear that the drive motors 106 disposed along lines L-1 and L-2 cannot be accommodated within the pipe at all. However, using the embodiment of apparatus protrayed in FIGS. 1-3, the apparatus may easily be adapted to fit within a pipe of the diameter indicated by showing 59a. Drive motors 106 shorter in length than that shown in FIG. 1 of the drawings may not be used because smaller drive motors would not fulfill the power requirements for driving internal pipeline equipment through pipes. Drive motors of the types employed in drive units for moving internal pipeline equipment are the smallest available which have the required driving power. The drive motor 106 is easily accommodated in the apparatus disclosed according to the invention when deployed in a direction longitudinal of the apparatus and of the pipe, but may not be accommodated when disposed in a direction transverse to the length of the apparatus and pipe.

Referring once more to FIG. 1, the drive unit which has been described is provided to propel an internal pipe apparatus through a pipe. Such an apparatus, for example an apparatus 140 shown in dashed lines in FIG. 1 may be propelled through a pipe 59 by the drive unit. Apparatus 140 may be connected to the drive unit at a flange 141 bolted to plate 17 by plural bolts 142, or in any other suitable manner.

While a preferred embodiment of apparatus according to the invention has been described and shown in the drawings, many modifications thereof may be made by a person skilled in the art without departing from the spirit of the invention, and it is intended to protect by Letters Patent all forms of the invention falling within the scope of the following claims.

I claim:

1. Drive unit for propelling internal pipeline equipment through pipelines, comprising at least one wheel means disposed to roll along the length of the interior wall of a pipe into which said drive unit is inserted, each said wheel means being rotatable about a wheel axis transverse to the pipe axis, support means supporting each said wheel means within said pipe and adapted for movement lengthwise of said pipe, rotative drive motor means having an axial length longer than can be accommodated transversely within said pipe with said drive motor means disposed parallel to each said wheel axis to drive said wheel means, said rotative drive motor means being supported by said support means with its axis disposed parallel to said pipe axis and perpendicular to each said wheel axis to be accommodated within said pipe, and drive transmission means associated with each said wheel means adapted to transmit rotational energy from said drive motor means to said wheel means perpendicularly disposed thereto to drive said wheel means; said drive motor means having a chain sprocket carried on an axial drive shaft thereof, each said wheel means having a chain sprocket parallel thereto and rotatable therewith, each said drive transmission means having a first chain sprocket aligned with said drive motor means chain sprocket and having a second chain sprocket aligned with the associated wheel means chain sprocket, a first drive chain engaged around said drive motor chain sprocket and each said first chain sprockets, and a second drive chain engaged around said second chain sprocket of each said drive transmission means and the associated wheel means chain sprocket, each said wheel means being mounted on a wheel support plate pivotably supported by said support means for movement about an axis radial with respect to a pipe in which said drive unit is disposed, and adjustment means carried by said support means for adjustably fixing the rotational position of each wheel support plate with relation to the radial axis whereby the camber of each wheel means may be adjusted.

2. The combination of claim 1, each said adjustment means comprising a pair of screws disposed through openings through said support means and engaging said wheel support plate one at each side of said radial axis.

3. Drive unit for propelling internal pipeline equipment through pipelines, comprising at least one wheel means disposed to roll along the length of the interior wall of a pipe into which said drive unit is inserted, each said wheel means being rotatable about a wheel axis transverse to the pipe axis, support means supporting each said wheel means within said pipe and adapted for movement lengthwise of said pipe, rotative drive motor means having an axial length longer than can be accommodated transversely within said pipe with said drive motor means disposed parallel to each said wheel axis to drive said wheel means, said rotative drive motor means being supported by said support means angularly to each said wheel axis to be accommodated within said pipe, and drive transmission means associated with each said wheel means adapted to transmit rotational energy from said drive motor means to said wheel means angularly disposed thereto to drive said wheel means, support means comprising spaced first and second parallel plates each disposed transversely of the axis of a pipe within which the drive unit is disposed, means interconnecting said first and second plates, said first plate being adapted for connection to internal pipeline equipment to be propelled through the pipe, said drive motor means being supported by said first plate and extending through an opening through said second plate, said wheel means being supported by said second plate, said drive transmission means each being supported by said first plate and extending through an opening through said second plate to be connected to a said wheel means.

4. The combination of claim 3, said drive motor means having its axis disposed parallel to said pipe axis and perpendicular to each said wheel axis.

5. The combination of claim 4, said drive means having a chain sprocket carried on an axial drive shaft thereof, each said wheel means having a chain sprocket parallel thereto and rotatable therewith, each said drive transmission means having a first chain sprocket aligned with said drive motor means chain sprocket and having a second chain sprocket aligned with the associated wheel means chain sprocket, a first drive chain engaged around said drive motor chain sprocket and each said first chain sprockets, and a second drive chain engaged around said second chain sprocket of each said drive transmission means and the associated wheel means chain sprocket.

6. The combination of claim 5, said drive unit having two said wheel means located at equal acute angles to opposite sides of the bottom center of said drive unit.

7. The combination of claim 6, said wheel means and the associated drive transmission means being identical.

8. The combination of claim 7, said drive transmission means each including a right angle drive means, and each including drive shaft means connecting said first chain sprocket and said right angle drive means.

9. The combination of claim 8, each said drive shaft means including universal joint means.

10. The combination of claim 9, said drive unit including upper idler wheel means supported from said second plate by a radially movable pivotal support, means for urging said idler wheel means upwardly, and adjustable means for limiting the upward travel of said idler wheel means whereby said idler wheel means will not inhibit introduction of said drive unit into the end of a pipe.

11. The combination of claim 10, said means for urging said idler wheel means upwardly comprising a drive cylinder.

12. The combination of claim 11, said adjustable means for limiting the upward travel of said idler wheel means comprising adjustment screw means on said pivotal support and screw contact means on said second plate.

13. The combination of claim 12, said screw contact means comprising a plate affixed to said second plate and angularly bent upwardly at its outer end to be engaged by said adjustment screw means substantially perpendicularly when said idler wheel means is moved upwardly.

14. The combination of claim 5, each said wheel means being mounted on a wheel support plate pivotally supported by said second plate for movement about an axis radial with respect to a pipe in which said drive unit is disposed, and adjustment means carried by said second plate for adjustably fixing the position of each wheel support plate with relation to the radial axis whereby the camber of each wheel means may be adjusted.

15. The combination of claim 14, each said adjustment means comprising a pair of screws disposed through openings through said second plate and engaging said wheel support plate one at each side of said radial axis.

* * * * *